(12) United States Patent
Supinski et al.

(10) Patent No.: US 11,540,024 B2
(45) Date of Patent: Dec. 27, 2022

(54) METHOD AND SYSTEM FOR PRECISE PRESENTATION OF AUDIOVISUAL CONTENT WITH TEMPORARY CLOSED CAPTIONS

(71) Applicant: ARRIS Enterprises LLC, Suwanee, GA (US)

(72) Inventors: Charles J. Supinski, Schwenksville, PA (US); Rakesh Rajan, Bengaluru (IN); Sadeesh Kumar Karuppiah, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/363,250

(22) Filed: Jun. 30, 2021

(65) Prior Publication Data

US 2021/0409833 A1     Dec. 30, 2021

Related U.S. Application Data

(60) Provisional application No. 63/046,602, filed on Jun. 30, 2020.

(51) Int. Cl.
*H04N 21/488* (2011.01)
*G06F 3/16* (2006.01)
(Continued)

(52) U.S. Cl.
CPC ......... *H04N 21/4884* (2013.01); *G06F 3/167* (2013.01); *H04N 21/42203* (2013.01);
(Continued)

(58) Field of Classification Search
None
See application file for complete search history.

(56) References Cited

U.S. PATENT DOCUMENTS 9,852,773 B1* 12/2017 Salvador ............... G11B 27/22
2010/0066903 A1   3/2010 Yang
(Continued)

FOREIGN PATENT DOCUMENTS

KR   10-2017-0045920 A    4/2017

OTHER PUBLICATIONS

Notification of Transmittal of the International Search Report (Forms PCT/ISA/220 and PCT/ISA/210) and the Written Opinion of the International Searching Authority (Form PCT/ISA/237) dated Oct. 25, 2021, by the International Application Division Korean Intellectual Property Office in corresponding International Application No. PCT/US2021/039508. (9 pages).

*Primary Examiner* — Samira Monshi
(74) *Attorney, Agent, or Firm* — Panitch Schwarze Belisario & Nadel LLC

(57) ABSTRACT

A method, set-top box, and non-transitory computer readable medium are disclosed for presentation of audiovisual content with closed captions. The method includes receiving, via an input device interfaced with the electronic device, an instruction requesting a replay of previously viewed video content with closed captioning; sending, to the display device interfaced with the electronic device, one or more thumbnail images of the previously viewed video content to be displayed on the display device; receiving, via the input device interfaced with the electronic device, one of the one or more thumbnail images of the previously viewed video content being selected for replay of the previously viewed video content; and sending, to the display device interfaced with the electronic device, closed captioning with the previously viewed video content starting at a video frame corresponding to the one of the one or more thumbnails of the previously viewed video content selected for replay.

17 Claims, 4 Drawing Sheets

(51) Int. Cl.
*H04N 21/422* (2011.01)
*H04N 21/8547* (2011.01)
*H04N 21/472* (2011.01)

(52) U.S. Cl.
CPC . *H04N 21/42206* (2013.01); *H04N 21/47217* (2013.01); *H04N 21/8547* (2013.01)

(56) References Cited

U.S. PATENT DOCUMENTS

| | | | |
|---|---|---|---|
| 2013/0014150 A1* | 1/2013 | Seo | G06F 3/04842 |
| | | | 725/14 |
| 2014/0111688 A1 | 4/2014 | Suvorov et al. | |
| 2015/0365735 A1 | 12/2015 | Kunisetty et al. | |
| 2018/0160069 A1 | 6/2018 | Burger | |

* cited by examiner

METHOD AND SYSTEM FOR PRECISE PRESENTATION OF AUDIOVISUAL CONTENT WITH TEMPORARY CLOSED CAPTIONS

FIELD

The present disclosure relates to a method and system for precise presentation of audiovisual (NV) content with temporary closed captions, and more specifically the technological improvement of display equipment to enable the precise presentation of audiovisual (NV) content with temporary closed caption text and/or subtitles.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access, live television, movies, visual media, and telephony. In order to consume these services, subscribers connect to a private network owned (or co-owned or rented) by the broadband cable operator which is implemented according to the Data Over Cable Service Interface Specification (DOCSIS) standard.

Closed captions and subtitles have revolutionized television, movies, and other visual media by enabling much broader accessibility, allowing individuals to enjoy media that may be produced in a foreign language, to allow for individuals to enjoy media when the accompanying audio may be unavailable, and to provide captions for dialogue and other descriptive text for the hearing impaired. Traditionally, closed caption text accompanies a video signal in a source signal that is transmitted out over the air, transmitted through coaxial cables, read though magnetic tape, etc., where text is displayed concurrently with a portion of the video signal (for example, where the text corresponds to dialogue spoken in the video signal).

Often, for example, when a user is watching live television (TV), recorded content and/or over-the-top (OTT) content, for example, delivery of film and/or TV content via the internet, the user may not understand and/or may miss some dialog or a conversation and would like to replay the video from that point in time (e.g., "what did they say?"). Currently, trick play modes provide options to rewind approximately to a specific time, for example, 2×, 4×, 16×, etc. However, this will not guarantee that the user will see the content from the exact position that he/she is interested. In some instances, this can result in the user either watching previous scenes that are not of interest to the user or the user may be required to rewind a few times to jump to the exact position that the user wishes to replay.

Accordingly, with the existing solutions, there is no way the user can jump to the exact position that the user is interested and also the user may want to have closed captions and/or subtitles only for portion of the content that is being replayed so that the user can have a better understanding of the scene in which the user did not hear or understood during the normal play.

Thus, there is a need of a technological solution to enable video display equipment to provide precise presentation of audiovisual (AN) content with temporary closed caption text or subtitles to a viewer to provide for access to closed captions, which can include, for example, any broadcast system such as Cable, terrestrial, or satellite, where LOD (Live of Disc) and DVR (Digital Video Recording) is supported.

SUMMARY

The present disclosure provides a method and system for precise presentation of audiovisual (AN) content with temporary closed captions, and more specifically the technological improvement of display equipment to enable the precise presentation of audiovisual (AN) content with temporary closed caption text and/or subtitles based on displaying one or more thumbnail images of previously of the previously viewed video content.

In accordance with an aspect, a method is disclosed for presentation of audiovisual content with closed captions, comprising: receiving, by an electronic device, a source signal that includes at least a video signal, an audio signal, and a plurality of closed caption entries, wherein each closed caption entry is associated with a portion of the video signal and the audio signal; storing, in a memory of the electronic device, the plurality of closed caption entries; sending, to a display device interfaced with the electronic device, the video signal and audio signal to be displayed on the display device; receiving, via an input device interfaced with the electronic device, an instruction requesting a replay of previously viewed video content with closed captioning; sending, to the display device interfaced with the electronic device, one or more thumbnail images of the previously viewed video content to be displayed on the display device; receiving, via the input device interfaced with the electronic device, one of the one or more thumbnail images of the previously viewed video content being selected for replay of the previously viewed video content; and sending, to the display device interfaced with the electronic device, closed captioning with the previously viewed video content starting at a video frame corresponding to the one of the one or more thumbnails of the previously viewed video content selected for replay.

In accordance with another aspect, a set-top box is disclosed configured to temporarily display closed captions, the set-top box comprising: a communications interface configured to receive a source signal that includes at least a video signal and a plurality of closed caption entries, wherein each closed caption entry is associated with a portion of the video signal; a memory of the electronic device configured to receive the plurality of closed caption entries; and a processor configured to: send to a display device interfaced with the set-top box, the video signal and audio signal to be displayed on the display device; receive, via an input device interfaced with the set-top box, an instruction requesting a replay of previously viewed video content with closed captioning; send, to the display device interfaced with the electronic device, one or more thumbnail images of the previously viewed video content to be displayed on the display device; receive, via the input device interfaced with the electronic device, one of the one or more thumbnail images of the previously viewed video content being selected for replay of the previously viewed video content; and send, to the display device interfaced with the electronic device, closed captioning with the previously viewed video content starting at a video frame corresponding to the one of the one or more thumbnails of the previously viewed video content selected for replay.

In accordance with a further aspect, a non-transitory computer readable medium having instructions operable to cause one or more processors to perform operations comprising: receiving, by an electronic device, a source signal that includes at least a video signal, an audio signal, and a plurality of closed caption entries, wherein each closed caption entry is associated with a portion of the video signal and the audio signal; storing, in a memory of the electronic device, the plurality of closed caption entries; sending, to a display device interfaced with the electronic device, the video signal and audio signal to be displayed on the display device; receiving, via an input device interfaced with the electronic device, an instruction requesting a replay of previously viewed video content with closed captioning; sending, to the display device interfaced with the electronic device, one or more thumbnail images of the previously viewed video content to be displayed on the display device; receiving, via the input device interfaced with the electronic device, one of the one or more thumbnail images of the previously viewed video content being selected for replay of the previously viewed video content; and sending, to the display device interfaced with the electronic device, closed captioning with the previously viewed video content starting at a video frame corresponding to the one of the one or more thumbnails of the previously viewed video content selected for replay.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Precise Presentation of AN Content with Temporary Closed Captions

Figure 1:
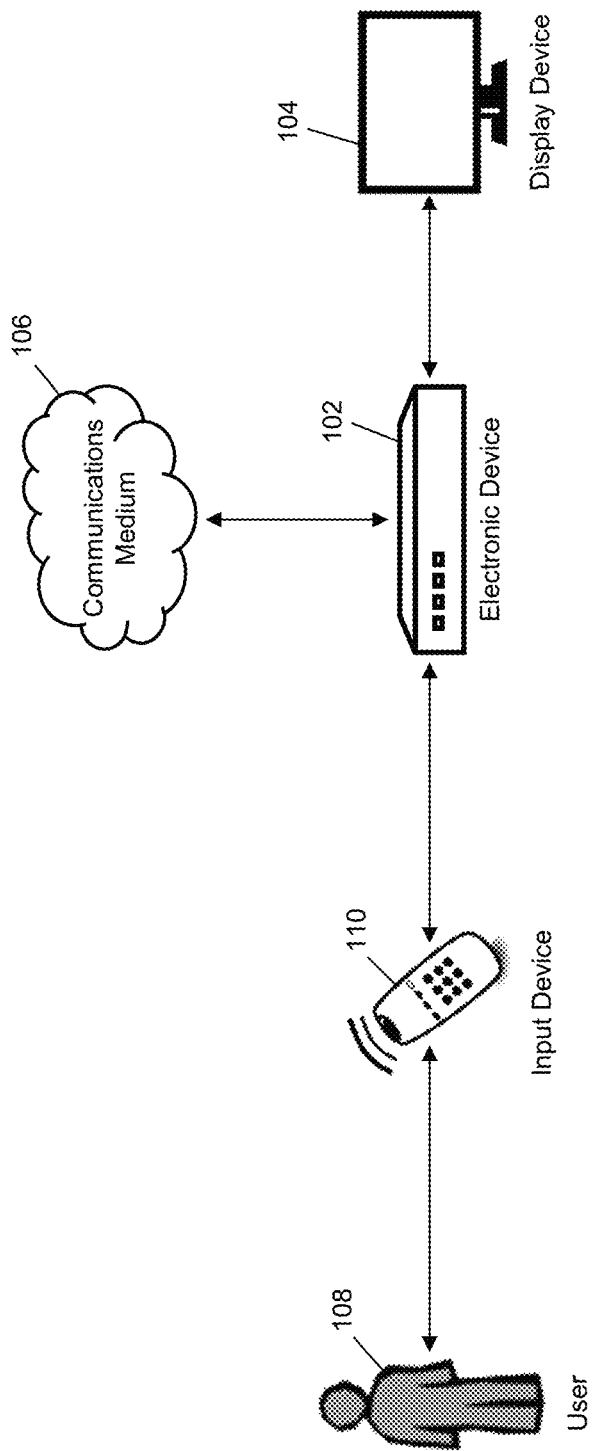
FIG. 1 is a block diagram illustrating a high level system architecture for providing precise presentation of audiovisual (NV) content with temporary closed captions in accordance with exemplary embodiments.

FIG. 1 illustrates a system 100 for the precise presentation of audiovisual (NV) content with temporary closed captions in accordance with exemplary embodiments. The system 100 may include an electronic device 102. The electronic device 102, discussed in more detail below, may be a computing device configured to receive source signals that are superimposed or otherwise encoded with a video signal and accompanying closed caption signal, which may be comprised of a plurality of closed caption entries. For instance, the electronic device 102 may be a television, smart television, set-top box, receiver, desktop computer, laptop computer, notebook computer, tablet computer, cellular phone, smart phone, smart watch, etc. In some instances, the electronic device 102 may be interfaced with a display device 104 or other device that may display the video signal and closed caption entries received by the electronic device 102. For instance, the electronic device 102 may be a set-top box connected to the display device 104, where the display device 104 may display the video signal and accompanying closed caption entries as received and instructed by the electronic device 102. The electronic device 102 and display device 104 may be interfaced through any suitable type of interface, such as coaxial cable, fiber optic cable, infrared transmission, a local area network, radio frequency, Bluetooth, etc. The electronic device 102 and display device 104 may be housed within a unitary housing, such as a television set, and hard wired and/or integrated together.

The electronic device 102 may receive a source signal that is electronically transmitted via a communications medium 106, such as over-the-air, over a cable connection (e.g., via HDMI cable, component cables, AN (composite) cable, coaxial cable, fiber optic, or other suitable physical cable), via satellite, or other suitable communications medium. For example, the communications medium 106 may be broadcast television, a local area network, cellular communication network, or the Internet where the source signal may be streamed to the electronic device 102 using the communications medium 106. In some instances, the source signal may be received from media inserted into one or more suitable input devices of the electronic device 102. For example, the source signal may be read from a digital video disc (DVD) or a Blu-ray disc.

The source signal may be superimposed or otherwise encoded with at least a video signal and a closed caption signal, the closed caption signal being comprised of a plurality of closed caption entries. Each closed caption entry may be associated with a portion of the video signal, where, traditionally, the closed caption entry is displayed on the display device 104 at the same time as the associated portion of the video signal. In some instances, the source signal may include a plurality of closed caption signals, where each closed caption signal may have different properties, such as the language of the caption texts (for example, where the language used may be specified by the viewer, a default language, etc.). As discussed herein, "closed captions" and closed caption text may also refer to subtitles, audio descriptions, descriptive video, or other types of captioning and subtitling that may accompany a video signal for display on a display device 104. Closed caption entries may be comprised of a plurality of text entries, images, or media in any other format that may be suitable for receipt and storage by the electronic device 102 and display on the electronic device 102 or an interfaced display device 104. In some embodiments, the formatting, transmission, and/or receipt of source signals that include closed captioning data may be subject to one or more standards, rules, or regulations, such as those set forth by the Federal Communications Commission (FCC), Consumer Electronics Association, Society of Cable Telecommunications Engineers, etc. In such embodiments, the electronic device 102 may be configured to operate in compliance with the standards, rules, and/or regulations set forth by the appropriate entity or entities.

The electronic device 102 may receive the source signal and may display the video and audio signal on the interfaced display device 104. At some point during the display of the video and audio signal, a user 108 of the electronic device 102 may desire to replay the video from a certain point with closed captioning temporarily enabled in order to more clearly understand the dialog. In accordance with an embodiment, the user can give a verbal or oral command, for example, "What did they say" or similar using a voice command on an input device 110 or by pressing a predefined key or keys on the input device 110 to initiate the feature. For example, the electronic device 102 can have a library of voice commands and upon receipt of one of the voice commands, the electronic device 102 can implement the method as disclosed herein. Alternatively, for example, a user or consumer can program the input device 110 and/or electronic device 102 with verbal or oral commands selected by the user or consumer to initiate the replay or playback of video content with closed captioning as described herein including the presentation of the one or more video frames or thumbnail images.

Figure 3:
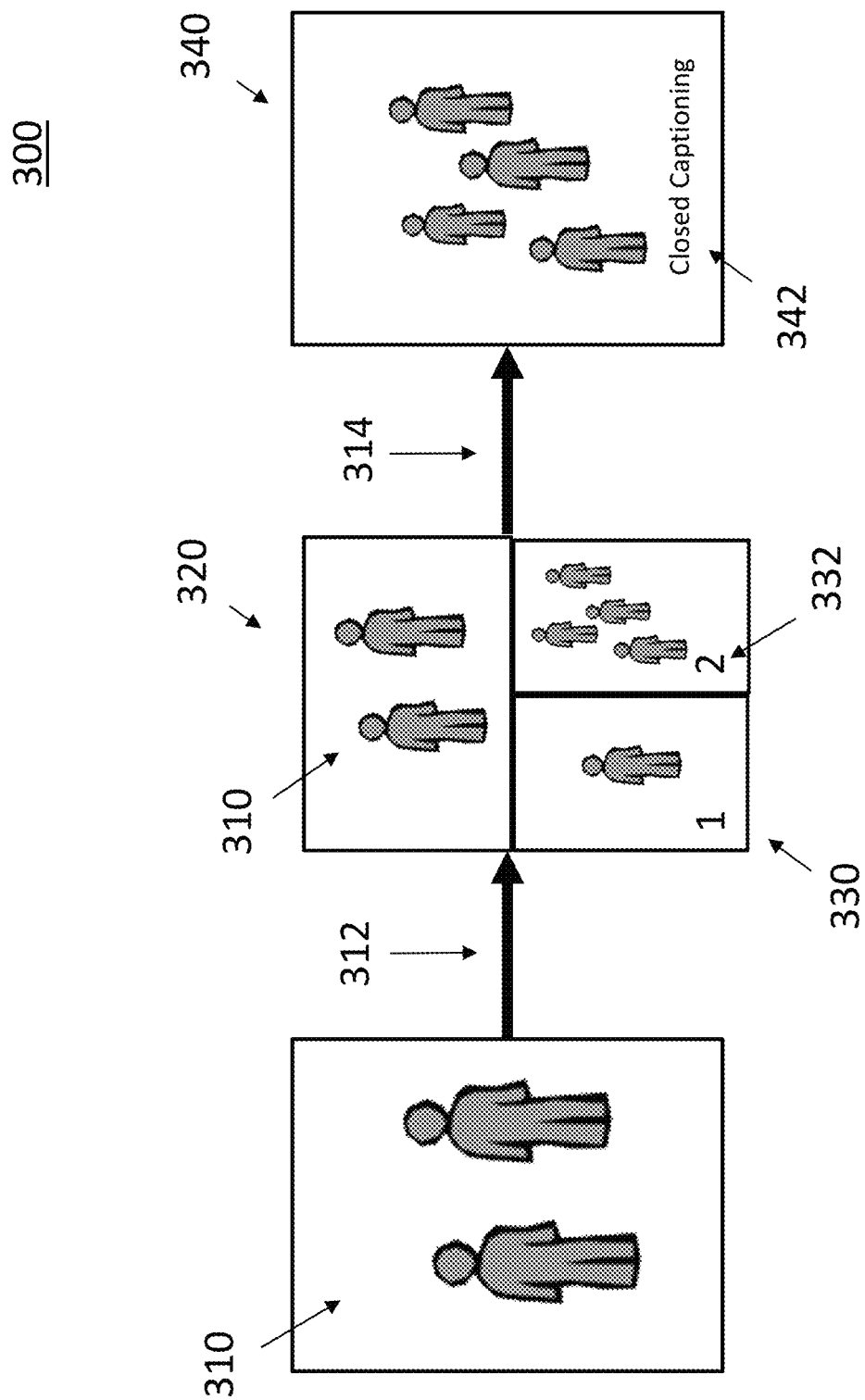
FIG. 3 is an illustration of a method for providing precise presentation of audiovisual (NV) content with temporary closed captions in accordance with exemplary embodiments.

In accordance with an aspect, the video frames can be listed in, for example, a navigable way with index numbers printed or displayed below as shown in FIG. 3. When the user finds the frame of interest, the user can either select the frame (for example, a thumbnail of an image), for example, by mentioning the frame index using the voice command feature of the input device 110 or pressing the index number using the a key or keys on the input device 110. Upon this action, the electronic device 102 automatically switches to the selected frame locating using, for example, a timestamp of the selected video frame and close captioning can be enabled. Once the video reaches the live position, for example, the position of the video prior to the voice command or pre-defined key or keys on the input device 110, the closed captions can be disabled if not previously enabled.

In accordance with an aspect, the input device 110 may be a remote control, mobile computing device (e.g., a tablet computer, cellular phone, smart phone, etc.), camera, microphone, or other suitable input device that may be interfaced with the electronic device 102 to provide user accessibility and input of user instructions.

The electronic device 102 may be configured to store a buffer of the closed caption entries that accompany the video signal being displayed on the display device 104. In some instances, the size of the buffer may be limited, such that only a predetermined amount of closed caption entries may be stored therein. For example, the electronic device 102 may store a predetermined number of closed caption lines or images, the closed caption lines or images corresponding to a predetermined length of time (for example, three minutes of the accompanying video signal), or closed caption lines or images up to a predetermined amount of memory (for example, 64 megabytes of closed caption lines or images). The buffer may be operated as a "first in, first out" buffer, such that each time a new closed caption entry is stored into the buffer, the earliest entry that had been added to the buffer is removed. In addition, other memory formats than a buffer may be used as an alternative or in combination with a buffer memory, such as random access memory with memory management to access to the recently played portions (particularly in situations such as playback of stored content) and possibly to remove closed captioning that is not likely to be accessed. For simplicity, buffer memory will be referenced to include all possibilities herein.

In accordance with aspect, when the electronic device 102 receives the voice command or the predefined keys on the input device 110 (e.g., instruction(s)) submitted by the user 108 to view previously presented video content, the electronic device 102 may access the buffer stored therein and access the previously presented video content and query the electronic device 102 for corresponding closed captions, which may then be displayed on the display device 104.

In accordance with an embodiment, the electronic device 102 may continue to update the buffer, such that, if the user 108 has navigated to the earliest closed caption entry in the buffer, the user 108 may be prevented from going back further than a predefined period of time. In some cases, the electronic device 102 may have a secondary buffer, for storage of closed caption entries for addition to the primary buffer during pausing of the buffer when being accessed by the user 108.

In some embodiments, timestamp information may be displayed with the earlier closed caption entries. For instance, each closed caption entry may further include a timestamp corresponding to the associated portion of the video signal. In such an instance, the timestamp may be displayed with the earlier closed caption entry, such as to indicate the time at which the corresponding closed caption is associated. In some such instances, the timestamp may be represented as a difference in time from the timestamp and the portion of the video signal being currently displayed. For example, the earlier closed caption entry may include "[−0: 18]" in or with the displayed text or image to indicate that the corresponding entry is associated with the portion of the video signal displayed eighteen seconds prior to the portion currently displayed on the display device 104. In some cases, additional information may be used to indicate the portion of the video signal to the user 108, such as a thumbnail image of the associated portion of the video signal.

Electronic Device

Figure 2:
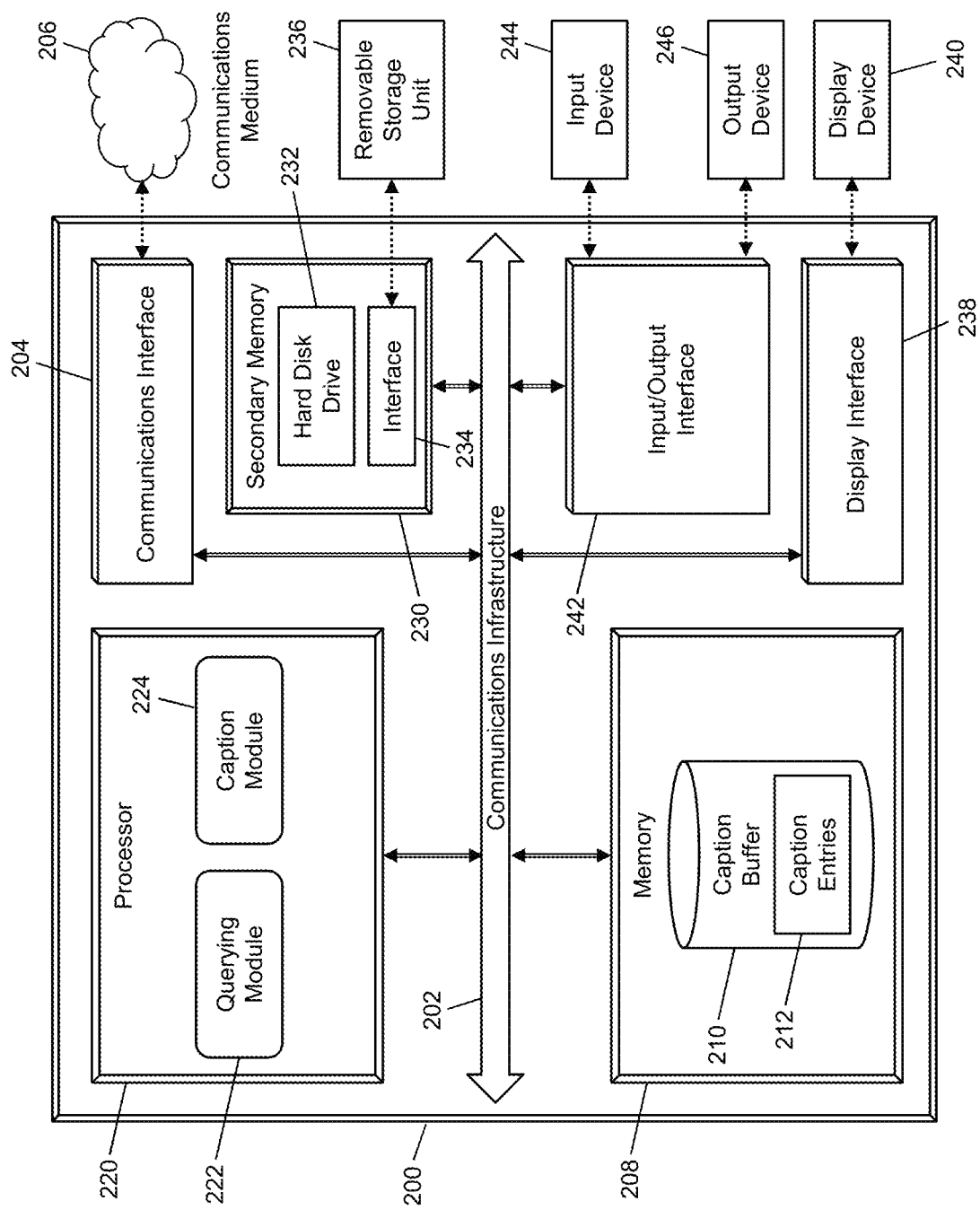
FIG. 2 is an exemplary hardware structure for an embodiment of a communication device for precise presentation of audiovisual (NV) content with temporary closed caption in accordance with exemplary embodiments.

FIG. 2 illustrates an exemplary hardware structure for an embodiment of a computer system 200 for precise presentation of audiovisual (NV) content with temporary closed caption in accordance with exemplary embodiments. It will be apparent to persons having skill in the relevant art that the embodiment of the computer system 200 can be the electronic device 102, the display device 104, and/or the input device 110 and as illustrated in FIG. 2 is provided as illustration only and may not be exhaustive to all possible configurations of the computer system 200 suitable for performing the functions as discussed herein.

The computer system 200 may include a communications infrastructure 202. The communications infrastructure 202 may be configured to transmit data between modules, engines, databases, memories, and other components of the computer system 200 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computer system 200 and external components of the computer system 200, such as externally connected databases, display devices, input devices, etc.

The computer system 200 may also include a communications interface 204. The communications interface 204 may include one or more interfaces used to interact with and facilitate communications between the computer system 200 and one or more external devices via suitable communications mediums 204. For instance, the communications interface 204 may interface with the communications infrastructure 202 and provide an interface 204 for connecting the computer system 200 to one or more communications mediums 204 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, cable television networks, satellite television networks, the Internet, radio frequency, Bluetooth, near field communication, etc.

In some instances, the computer system 200 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded on the parsing module. For example, the communications interface 204 may include (e.g., or otherwise have access to, such as via the communications infrastructure 202) a parser program configured to receive and transform the received data signal into usable input for the functions performed by the processing device to carry out the methods and systems described herein.

The communications interface 204 may be configured to receive data signals electronically transmitted through a communications medium 106, such as from an internet service provider, cable television provider, satellite television provider, etc., which may be superimposed or otherwise encoded with source signals that are comprised of video and closed captioning signals. In some instances, a source signal may include a plurality of closed captioning signals, such as closed captioning signals for each of a plurality of different languages, and may also include one or more audio signals.

The computer system 200 may also include a memory 208. The memory 208 may be configured to store data for use by the computer system 200 in perform the functions discussed herein. The memory 208 may be comprised of one or more types of memory using one or more suitable types of memory storage, such as random access memory, read-only memory, hard disk drives, solid state drives, magnetic tape storage, etc. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computer system 200 may include a caption buffer 210. The caption buffer 210 may be configured to store a plurality of caption entries 212 using a suitable storage format and schema. Each caption entry 212 may be a closed caption entry associated with a previously displayed (for example, or previously transmitted, such as to the display device 104) portion of the video signal. Each closed caption entry 212 may be a text field, image file, or other suitable file format. In some embodiments, the caption entries 212 may be stored in the caption buffer 210 using a first in, first out methodology, such that, when the caption buffer 210 is at capacity, each time a new caption entry 212 is inserted into the caption buffer 210, the earliest added caption entry 212 currently in the caption buffer 210 is removed. Capacity of the caption buffer 210 may be determined by the number of caption entries 212, file size of the caption entries 212, a total portion of time of the video signal associated with each of the caption entries 212, etc.

The computer system 200 may also include a processor 220. The processor 220 may be configured to perform the functions of the computer system 200 discussed herein as will be apparent to persons having skill in the relevant art. In some embodiments, the processor 220 may include and/or be comprised of a plurality of engines and/or modules specially configured to perform one or more functions of the processing device, such as a querying module 222, caption module 224, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the computer system 200 may include a querying module 222. The querying module 222 may be configured to execute queries on databases to identify information. The querying module 222 may receive one or more data values or query strings, and may execute a query string based thereon on an indicated database, such as the caption buffer 210, to identify information stored therein. The querying module 222 may then output the identified information to an appropriate engine or module of the computer system 200 as necessary. The querying module 222 may, for example, execute queries on the caption buffer 210 for management of the buffer, such as to insert new caption entries 212 and remove old caption entries 212. The querying module 222 may also execute queries on the caption buffer 210 to identify caption entries 212 for display on the display device 104 following the receipt of user instructions.

The processor 220 of the computer system 200 may also include a caption module 224. The caption module 224 may be configured to manage the display of captions on the display device 104 in accordance with the functions discussed herein. For example, the caption module 224 may be configured to activate or deactivate the display of closed captions on the display device, manage the display of active closed caption entries, replace active closed caption entries with earlier closed caption entries (for example, identified via the querying module 222) or display earlier closed caption entries concurrently with active closed caption entries, modify the settings of earlier closed caption entries for distinguishing on the display device 104, etc.

In some embodiments, the computer system 200 may also include a secondary memory 230. The secondary memory 230 may be another memory in addition to the memory 208 that may be used to store additional data for use in performing the functions of the computer system 200 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computer system 200 may also include a display interface 238. The display interface may be configured to interface the computer system 200 with one or more display devices 240, such as the display device 104. The display devices 240 may be devices configured to display data received from the computer system 200. Display devices 240 may be any suitable type of display, including, for example, liquid crystal displays, light emitting diode displays, thin film transistor display, capacitive touch displays, etc. In some instances, the computer system 200 may include one or more display interfaces 238, which may interface with one or more display devices 240. Display devices 240 may, for example, display the video signal received by the computer system 200 and, if activated, display the associated closed caption entries. The display devices 240 may also be configured to display earlier closed caption entries based on instructions submitted to the computer system 200 by the user 108 without interrupting display of the video signal.

The computer system 200 may also include an input/output interface 242. The input/output interface 242 may be configured to interface the computer system 200 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to a computer system 200, such as a keyboard, mouse, microphone, camera, touch screen, click wheel, scroll wheel, remote control, etc. Input devices 244 may be configured to receive input from a user of the computer system 200, such as the user 108, which may include an instruction submitted to view earlier closed caption entries. Additional instructions that may be received via the input device 244 include instructions to navigate forward and backward through earlier closed caption entries, cancel the display of earlier closed caption entries, and manage the settings for display of earlier closed caption entries. Output devices 246 may include any suitable type of device for outputting data from a computer system 200, such as a speaker, remote control, headset, tactile feedback device, etc.

Exemplary Method for Temporary Display of Closed Captions

FIG. 3 is an illustration of a method for providing precise presentation of audiovisual content with temporary closed captions in accordance with exemplary embodiments. As shown in FIG. 3, the user or consumer can be watching either a live television show, for example, a movie or sporting event, recorded content, and/or over-the-top content 310 on the display device 104. When the user does not understand, temporary distracted, or misses some dialog or a conversation and would like to replay the video from that point in time, in step 312, the user can give a verbal or oral command, for example, "What did they say" or similar using a voice command on the input device 110 or by pressing a pre-defined key or keys on the input device 110 to initiate the feature. In accordance with an aspect, upon the initiation of the precise presentation of audiovisual (AN), the display screen 320 can include the current video frame 310 and one or more previous video frames 330, for example, thumbnails images, which can be listed in a navigable way, for example, with index numbers 332 printed or displayed below the thumbnail image 330. In accordance with an embodiment, the one or more previous video frames 330 can be more than one (1) video frame, and may be two (2) to eight (8) video frames, and may be, for example, four (4) video frames. In accordance with an embodiment, the one or more videos frames can be either a time-based, for example, 2×, 4×, 8×, 16×, of a preset period of time, or alternatively, a scene-based from available scene information, for example, in the form of BIF-files or standard thumbnail files for HTTP Live Streaming (HLS) or Dynamic Adaptive Streaming over HTTP (DASH). In accordance with an exemplary embodiment, time-based video frames and/or scene-based videos frames can include an index, for example, a corresponding timestamp. In addition, the time-based video frames and/or scene-based videos frames can be content from any source including, for example, live television (TV) and recorded content received via Cable, Satellite, Terrestrial, IP, and/or over-the-top (OTT) content, such as HLS or DASH having LOD (Live of Disc) capability, and wherein a rewind feature is supported.

In accordance with an exemplary embodiment, the user can select a frame or thumbnail of interest, for example, by mentioning the frame index 332 using the voice command feature of the input device 110 or pressing the index number using the a key or keys on the input device 110. Upon this action, in step 314 the electronic device 102 automatically switches to the selected frame 330, for example, by the corresponding timestamp of the selected video frame 340 and closed captioning 342 can be enabled. Once the video reaches the live position, for example, the position of the video prior to the voice command or pre-defined key or keys on the input device 110, the closed captions can be disabled, if closed caption had not previously been enabled.

In accordance with an embodiment, when the electronic device 102 decodes an audio and visual stream, for example, for live television, frames can be indexed with a timestamp and stored in the secondary memory 230 as disclosed herein. For example, the one or more video frames 330 can be key frames that can be achieved by storing the key frames as JPEG files and an index file can store the JPEG file name along with the timestamp. In accordance with an embodiment, the key frame may be a location on a timeline which marks a beginning or end of a transition, for example, from one scene to another scene. The stored JPEG files can be used to provide the thumbnail display for the user to navigate and select the video frame 332 to be replayed with closed captioning 342. In accordance with an embodiment, when a specific frame is selected, the timestamp associated with the JPEG frame can be sent to a decoder, for example, the query module 222 to play from the given location. Alternatively, if the storage is a constraint, then the video frames provided to the user can be for a set duration, for example, a number of frames and/or a set time. In accordance with an exemplary embodiment, the key frames can be stored in any image format, for example, JPEG, PNG, BMP, etc.

Figure 4:
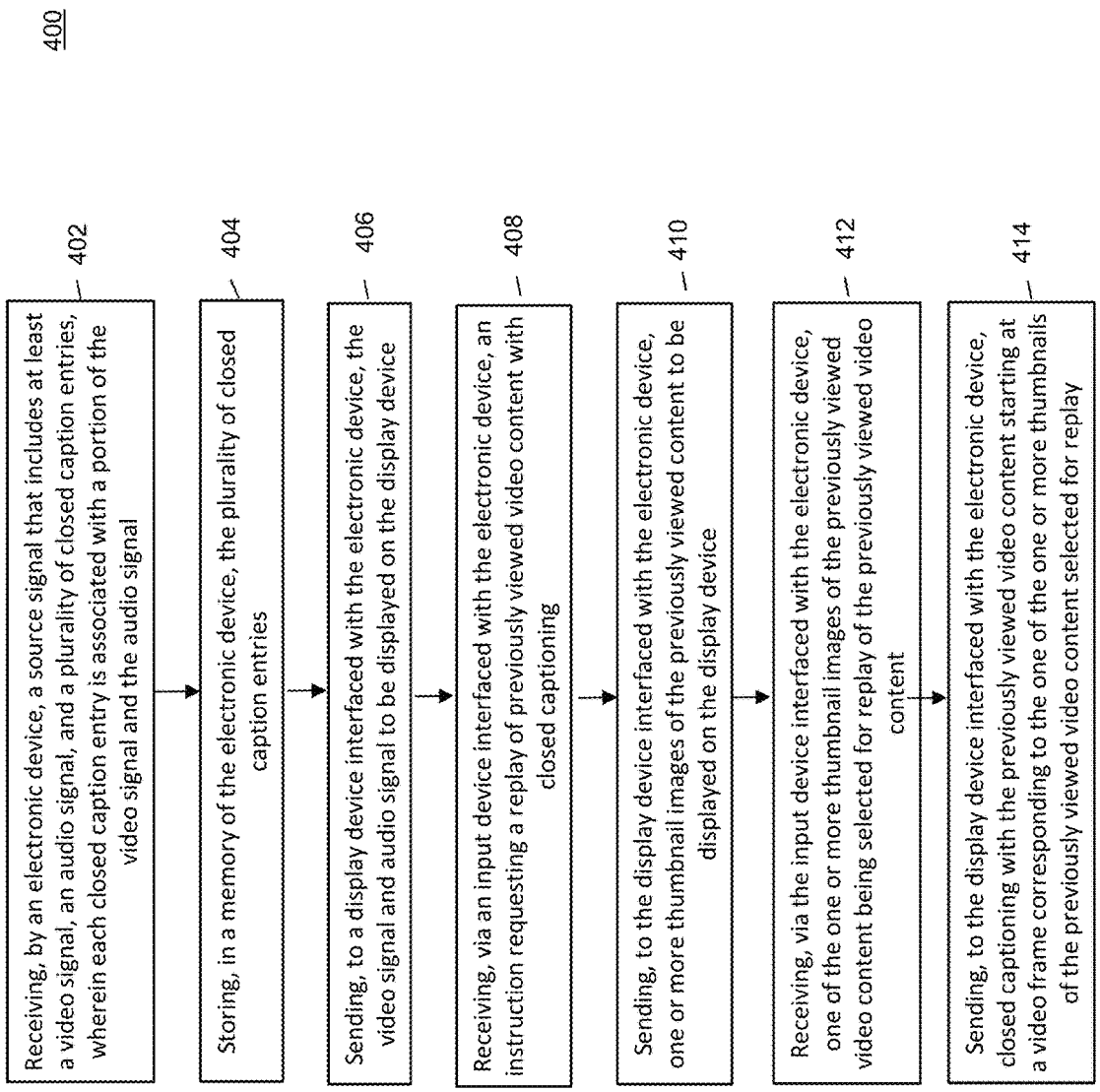
FIG. 4 is a flow chart illustrating an exemplary method for precise presentation of audiovisual content with temporary closed captions in accordance with exemplary embodiments.

FIG. 4 is a flow chart 400 illustrating an exemplary method for precise presentation of audiovisual content with temporary closed captions in accordance with exemplary embodiments. As shown in FIG. 4, in step 402, an electronic device received a source signal that includes at least a video signal, an audio signal, and a plurality of closed caption entries, wherein each closed caption entry is associated with a portion of the video signal and the audio signal. In step 404, in a memory of the electronic device, the plurality of closed caption entries are stored. In step 406, the video signal and audio signal to be displayed on the display device are sent to a display device interface with the electronic device. In step 408, an instruction requesting a replay of the previously viewed video content with closed captioning is received via an input device interfaced with the electronic device. In step 410, one or more thumbnail images of the previously viewed video content to be displayed on the display device are sent to the display device interfaced with the electronic device. In step 412, one of the one or more thumbnail images of the previously viewed video content being selected for replay of the previously viewed video content is received via the input device interfaced with the electronic device. In step 414, closed captioning with the previously viewed video content starting at a video frame corresponding to the one of the one or more thumbnails of the previously viewed video content selected for replay is sent to the display device interfaced with the electronic device.

In accordance with an embodiment, the closed captioning with the previously viewed video content until a video frame corresponding to a timestamp associated with when the instruction requesting the replay of the previously viewed video content with closed captioning was received by the electronic device may be send to the display device interfaced with the electronic device. In addition, the closed captioning for video content can be disabled after the video frame corresponding to the timestamp associated with when the instruction requesting the replay of the previously viewed video content with closed captioning was sent.

In accordance with another embodiment, the one or more thumbnail images of the previously viewed video content to be displayed on the display device may be four (4) or more thumbnail images, and the method further includes querying, the electronic device, for the previously viewed video content and corresponding closed captioning from the plurality of the plurality of closed caption entries stored on the memory of the electronic device.

In accordance with an embodiment, the electronic device 102 is a set-top box and the input device 110 is a remote control, and the method includes: sending, via the remote control interfaced with the set-top box, the instruction requesting the replay of the previously viewed video content with closed captioning via a voice command or one or more keys on the remote control, and receiving, via the remote control interfaced with the set-top box, the one of the one or more thumbnail images of the previously viewed video content being displayed on the display device via the voice command or the one or more keys on the remote control.

In accordance with another embodiment, the source signal is live television, and the method includes indexing frames from the source signal with timestamps, and storing the indexed frames with the timestamps for retrieval upon the receiving of the instruction requesting the replay of the previously viewed video content with closed captioning. In addition, the method can include storing key frames from the source signal as files in an imaging format, for example, such JPEG, PNG, BMP, etc. and generating an index file for each of the files with a timestamp, generating the one or more thumbnail images of the previously viewed video content from the stored files, and retrieving the previously viewed video content selected based on a timestamp associated with an imaging format frame corresponding to the selected one of the one or more thumbnail images of the previously viewed video content.

In accordance with an embodiment, the one or more thumbnail images of the previously viewed video content is time-based, scene-based in a form of an image file format or thumbnail from HTTP Live Streaming (HLS), Dynamic Adaptive Streaming over HTTP (DASH), or any broadcasting mode including cable, terrestrial, and/or satellite where LOD (Live of disc) is supported.

In accordance with another embodiment, the method includes enabling closed captioning only upon receipt of the instruction requesting the replay of the previously viewed video content with closed captioning, and disabling the closed captioning upon a completion of the viewing of the replay of the previously viewed video content with closed captioning.

Techniques consistent with the present disclosure provide, among other features, a method and apparatus for precise presentation of audiovisual content with temporary closed captions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for presentation of audiovisual content with closed captions, comprising:
   receiving, by an electronic device, a source signal for an audiovisual content that includes at least a video signal, an audio signal, and a plurality of closed caption entries, wherein the plurality of closed caption entries is associated with portions of the video signal and the audio signal;
   storing, in a memory of the electronic device, the plurality of closed caption entries;
   sending, to a display device interfaced with the electronic device, the audiovisual content comprising at least the video signal and the audio signal;
   receiving, via an input device interfaced with the electronic device, an instruction requesting a replay of previously viewed video content with closed captioning for the audiovisual content currently being sent to the display device;

sending, to the display device interfaced with the electronic device, one or more thumbnail images of the previously viewed video content for the audiovisual content currently being sent to the display device;

receiving, via the input device interfaced with the electronic device, one of the one or more thumbnail images of the previously viewed video content being selected for replay of the previously viewed video content for the audiovisual content currently being sent to the display device; and sending, to the display device interfaced with the electronic device, closed captioning with the previously viewed video content starting at a video frame corresponding to the one of the one or more thumbnails of the previously viewed video content selected for replay for the audiovisual content currently being sent to the display device until a video frame corresponding to a timestamp associated with when the instruction requesting the replay of the previously viewed video content with closed captioning was received by the electronic device.

2. The method according to claim 1, further comprising: disabling the closed captioning for the previously viewed video content after the video frame corresponding to the timestamp associated with when the instruction requesting the replay of the previously viewed video content with closed captioning was sent.

3. The method according to claim 1, wherein the one or more thumbnail images of the previously viewed video content to be displayed on the display device is four (4) or more thumbnail images, the method further comprising: querying, the electronic device, for the previously viewed video content and corresponding closed captioning from the plurality of the plurality of closed caption entries stored on the memory of the electronic device.

4. The method according to claim 1, wherein the electronic device is a set-top box and the input device is a remote control, the method comprising:
sending, via the remote control interfaced with the set-top box, the instruction requesting the replay of the previously viewed video content with closed captioning via a voice command or one or more keys on the remote control; and
receiving, via the remote control interfaced with the set-top box, the one of the one or more thumbnail images of the previously viewed video content being displayed on the display device via the voice command or the one or more keys on the remote control.

5. The method according to claim 1, wherein the source signal is live television, the method comprising:
indexing frames from the source signal with timestamps; and
storing the indexed frames with the timestamps for retrieval upon the receiving of the instruction requesting the replay of the previously viewed video content with closed captioning.

6. The method according to claim 1, further comprising: storing key frames from the source signal as files in an imaging format and generating an index file for each of the files with a timestamp;
generating the one or more thumbnail images of the previously viewed video content from the stored files; and
retrieving the previously viewed video content selected based on a timestamp associated with an imaging format frame corresponding to the selected one of the one or more thumbnail images of the previously viewed video content.

7. The method according to claim 1, wherein the one or more thumbnail images of the previously viewed video content is time-based, scene-based in a form of an image file format or thumbnail from HTTP Live Streaming (HLS), Dynamic Adaptive Streaming over HTTP (DASH), or any broadcasting mode including cable, terrestrial, and/or satellite where LOD (Live of disc) is supported.

8. The method according to claim 1, further comprising:
enabling closed captioning only upon receipt of the instruction requesting the replay of the previously viewed video content with closed captioning; and
disabling the closed captioning upon a completion of the viewing of the replay of the previously viewed video content with closed captioning.

9. A set-top box configured to temporarily display closed captions, the set-top box comprising:
a communications interface configured to receive a source signal for an audiovisual content that includes at least a video signal and a plurality of closed caption entries, wherein the plurality of closed caption entries is associated with portions of the video signal;
a memory of the set-top box configured to receive the plurality of closed caption entries; and
a processor configured to:
send, to a display device interfaced with the set-top box, the audiovisual content comprising at least the video signal and the audio signal;
receive, via an input device interfaced with the set-top box, an instruction requesting a replay of previously viewed video content with closed captioning for the audiovisual content being sent to the display device;
send, to the display device interfaced with the electronic device, one or more thumbnail images of the previously viewed video content for the audiovisual content currently being sent to the display device;
receive, via the input device interfaced with the electronic device, one of the one or more thumbnail images of the previously viewed video content being selected for replay of the previously viewed video content for the audiovisual content currently being sent to the display device; and
send, to the display device interfaced with the electronic device, closed captioning with the previously viewed video content starting at a video frame corresponding to the one of the one or more thumbnails of the previously viewed video content selected for replay for the audiovisual content currently being sent to the display device until a video frame corresponding to a timestamp associated with when the instruction requesting the replay of the previously viewed video content with closed captioning was received by the electronic device.

10. The set-top box of claim 9, wherein the processor is configured to:
disable the closed captioning for the previously viewed video content after the video frame corresponding to the timestamp associated with when the instruction requesting the replay of the previously viewed video content with closed captioning was sent.

11. The set-top box of claim 9, wherein the one or more thumbnail images of the previously viewed video content to be displayed on the display device is four (4) or more thumbnail images, and the processor is configured to:

query, the set-top box, for the previously viewed video content and corresponding closed captioning from the plurality of the plurality of closed caption entries stored on the memory of the set-top box.

12. The set-top box according to claim 9, wherein the input device is a remote control, and the processor is further configured to:

send, via the remote control interfaced with the set-top box, the instruction requesting the replay of the previously viewed video content with closed captioning via a voice command or one or more keys on the remote control; and receive, via the remote control interfaced with the set-top box, the one of the one or more thumbnail images of the previously viewed video content being displayed on the display device via the voice command or the one or more keys on the remote control.

13. The set-top box according to claim 9, wherein the source signal is live television, the processor configured to:

index frames from the source signal with timestamps; and store the indexed frames with the timestamps for retrieval upon the receiving of the instruction requesting the replay of the previously viewed video content with closed captioning.

14. A non-transitory computer readable medium having instructions operable to cause one or more processors to perform operations comprising:

receiving, by an electronic device, a source signal for an audiovisual content that includes at least a video signal, an audio signal, and a plurality of closed caption entries, wherein the plurality of closed caption entries is associated with portions of the video signal and the audio signal;

storing, in a memory of the electronic device, the plurality of closed caption entries;

sending, to a display device interfaced with the electronic device, the audiovisual content comprising at least the video signal and the audio signal;

receiving, via an input device interfaced with the electronic device, an instruction requesting a replay of previously viewed video content with closed captioning for the audiovisual content currently being sent to the display device;

sending, to the display device interfaced with the electronic device, one or more thumbnail images of the previously viewed video content for the audiovisual content currently being sent to the display device;

receiving, via the input device interfaced with the electronic device, one of the one or more thumbnail images of the previously viewed video content being selected for replay of the previously viewed video content for the audiovisual content currently being sent to the display device; and sending, to the display device interfaced with the electronic device, closed captioning with the previously viewed video content starting at a video frame corresponding to the one of the one or more thumbnails of the previously viewed video content selected for replay for the audiovisual content currently being sent to the display device until a video frame corresponding to a timestamp associated with when the instruction requesting the replay of the previously viewed video content with closed captioning was received by the electronic device.

15. The non-transitory computer readable medium according to claim 14, further comprising:

disabling the closed captioning for the previously viewed video content after the video frame corresponding to the timestamp associated with when the instruction requesting the replay of the previously viewed video content with closed captioning was sent.

16. The non-transitory computer readable medium according to claim 14, wherein the one or more thumbnail images of the previously viewed video content to be displayed on the display device is four (4) or more thumbnail images, the method further comprising:

querying, the electronic device, for the previously viewed video content and corresponding closed captioning from the plurality of the plurality of closed caption entries stored on the memory of the electronic device.

17. The non-transitory computer readable medium according to claim 14, wherein the electronic device is a set-top box and the input device is a remote control, the method comprising:

sending, via the remote control interfaced with the set-top box, the instruction requesting the replay of the previously viewed video content with closed captioning via a voice command or one or more keys on the remote control; and receive, via the remote control interfaced with the set-top box, the one of the one or more thumbnail images of the previously viewed video content being displayed on the display device via the voice command or the one or more keys on the remote control.

* * * * *